United States Patent [19]
Wilson

[11] 4,379,669
[45] Apr. 12, 1983

[54] TOBACCO HANDLING APPARATUS

[75] Inventor: Robert W. Wilson, Charlotte, N.C.

[73] Assignee: Powell Manufacturing Company, Inc., Bennettsville, S.C.

[21] Appl. No.: 207,288

[22] Filed: Nov. 17, 1980

Related U.S. Application Data

[63] Continuation of Ser. No. 949,407, Oct. 10, 1978, abandoned, which is a continuation of Ser. No. 629,974, Nov. 7, 1975, abandoned.

[51] Int. Cl.³ .............................................. A01D 45/16
[52] U.S. Cl. ........................................ 414/21; 56/27.5; 414/26; 414/269; 414/300; 414/340
[58] Field of Search ................... 414/21, 26, 269, 270, 414/272, 293, 300, 340; 56/27.5, 344; 294/5.5; 198/639, 640, 641

[56] References Cited

U.S. PATENT DOCUMENTS

| | | | |
|---|---|---|---|
| 655,320 | 8/1900 | Anderson | 298/8 R |
| 1,979,624 | 11/1934 | Kluy . | |
| 2,670,839 | 3/1954 | Aasland | 198/640 |
| 2,732,961 | 1/1956 | Ervin . | |
| 2,812,052 | 11/1957 | Doyer | 198/641 |
| 2,816,411 | 12/1957 | Wilson | 56/27.5 |
| 2,896,797 | 7/1959 | Bell . | |
| 2,929,658 | 3/1960 | Killebrew | 298/8 R |
| 2,940,615 | 6/1960 | Long . | |
| 2,952,370 | 9/1960 | Long . | |
| 3,083,517 | 4/1963 | Wilson | 56/27.5 |
| 3,158,401 | 11/1964 | Naraghi | 298/8 R |
| 3,215,288 | 11/1965 | Long . | |
| 3,229,831 | 1/1966 | Long . | |
| 3,230,639 | 1/1966 | Welles . | |
| 3,235,061 | 2/1966 | Craig | 198/641 |
| 3,472,548 | 10/1969 | Comisac | 298/23 C |
| 3,507,103 | 4/1970 | Pickett | 56/27.5 |
| 3,593,506 | 7/1971 | Casada | 56/27.5 |
| 3,606,009 | 9/1971 | Clendenin et al. | 298/8 X |
| 3,664,526 | 5/1972 | Dildey . | |
| 3,698,576 | 10/1972 | Gillette | 414/301 |
| 3,772,862 | 11/1973 | Wilson | 56/27.5 |
| 3,813,861 | 6/1974 | Wood | 56/344 |
| 3,834,137 | 9/1974 | Long | 56/27.5 |
| 3,844,617 | 10/1974 | Kostman | 298/18 X |
| 3,885,376 | 5/1975 | Johnson | 56/27.5 |
| 3,888,533 | 6/1975 | Long | 294/5.5 |
| 3,902,607 | 9/1975 | Middleton . | |
| 3,921,824 | 11/1975 | Larrache . | |
| 3,946,542 | 3/1976 | Long | 56/27.5 |
| 3,948,553 | 4/1976 | Suggs | 294/5.5 |
| 3,991,544 | 11/1976 | Allwood | 56/344 |
| 4,047,365 | 9/1977 | Suggs | 414/300 |

Primary Examiner—Leslie J. Paperner
Attorney, Agent, or Firm—Cushman, Darby & Cushman

[57] ABSTRACT

Tobacco handling apparatus that receives tobacco from a source, such as a trailer, and elevates it by a conveyor to a discharge end from which it is discharged in a flow path having a substantial maximum horizontal extent disposed above a container that has an elongated horizontal extent aligned with and underneath the flow path for receipt of the tobacco leaves in condition for subsequent curing. An oscillatable or reciprocable baffle, or a variable speed conveyor or feed roll is included for varying the horizontal extent of the flow path within the maximum extent in a generally uniform manner to cause the leaves to be distributed substantially uniformly along the elongated extent of the container. A pair of aligned tobacco containers may be used having a combined horizontal extent in the direction of the flow path corresponding to the variation of the flow path extent with two baffle plate deflectors selectively operable to fill the containers alternately, and with the containers mounted for weighing of the tobacco to provide an indication when each container is full.

24 Claims, 18 Drawing Figures

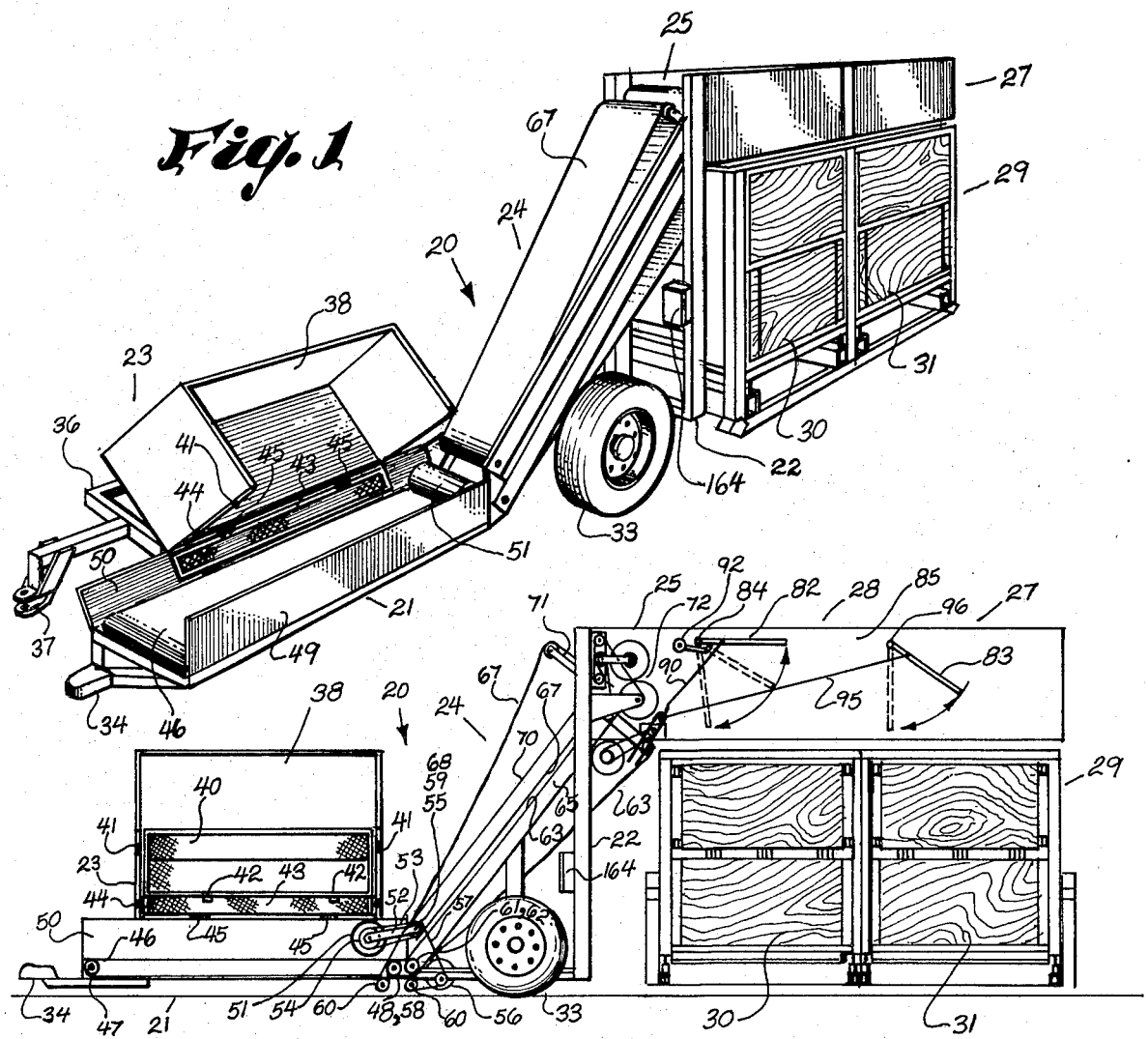
Fig. 1
Fig. 2
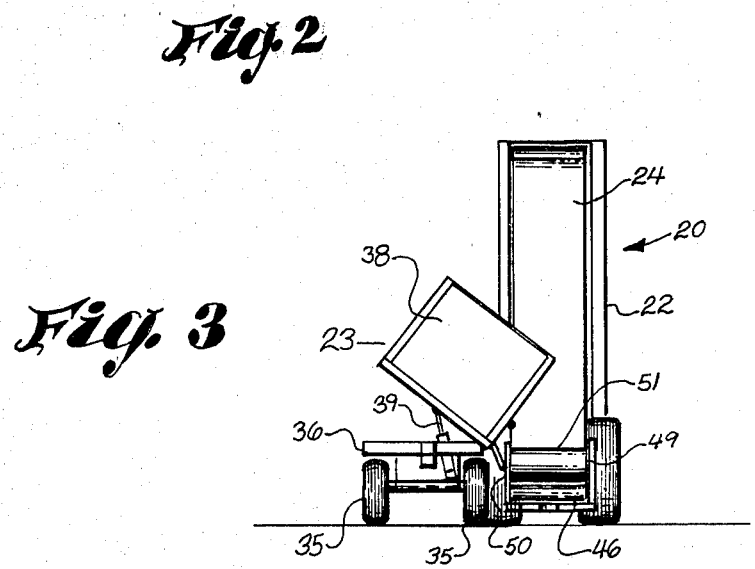
Fig. 3

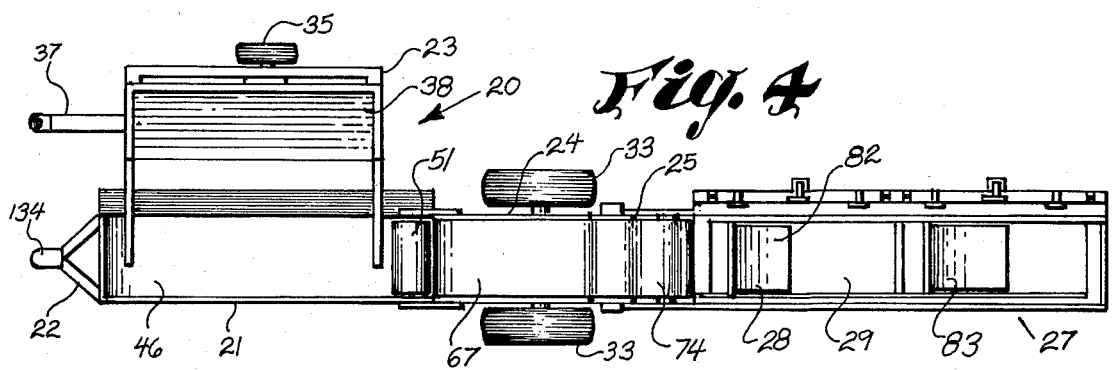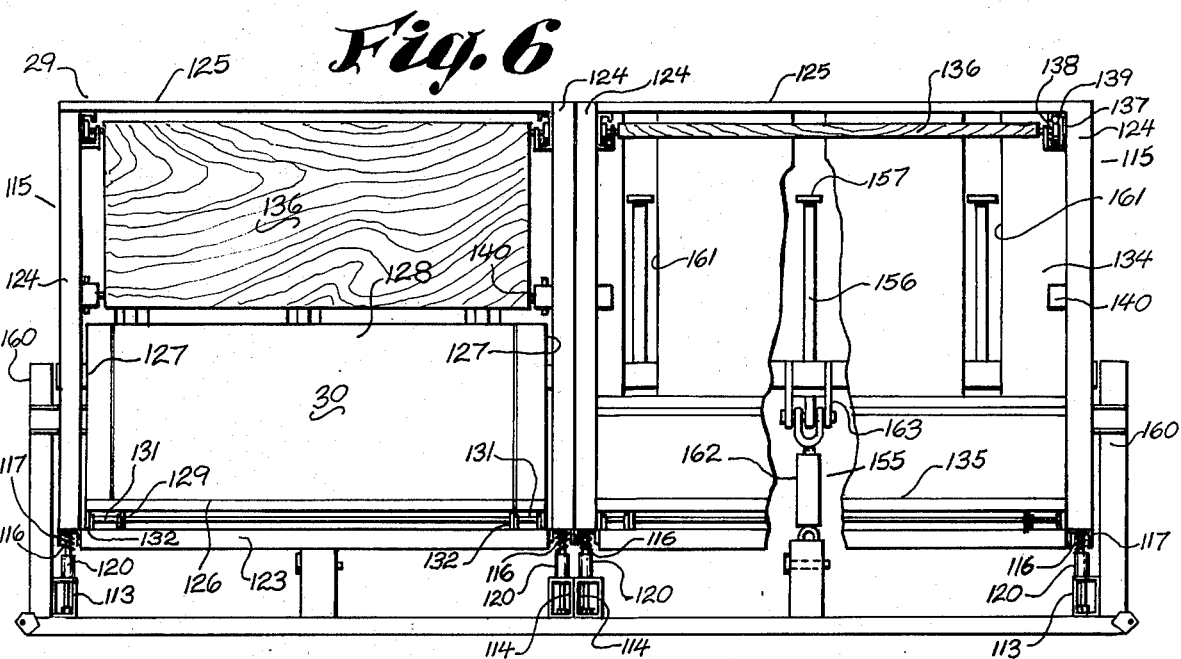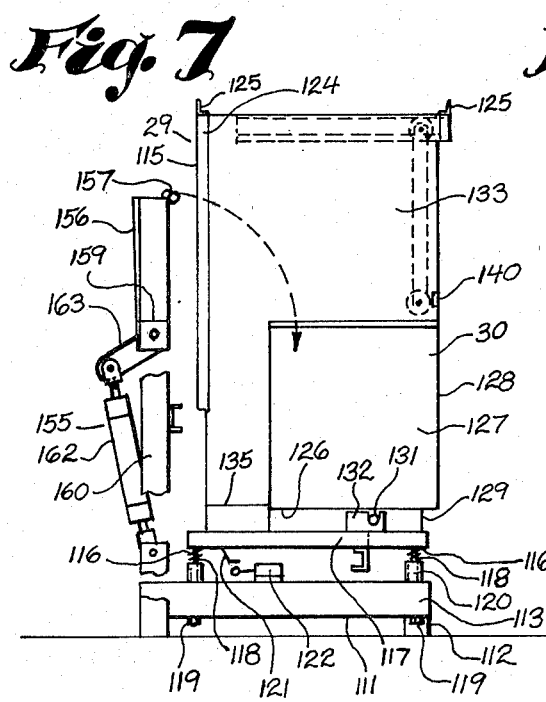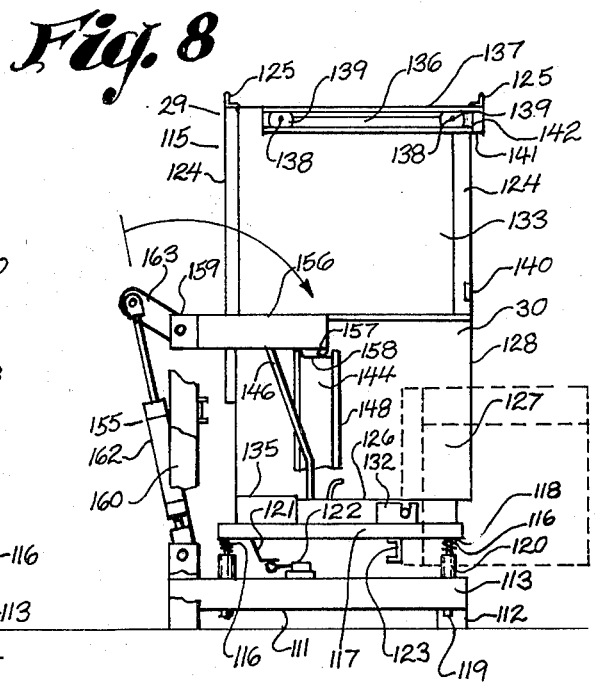

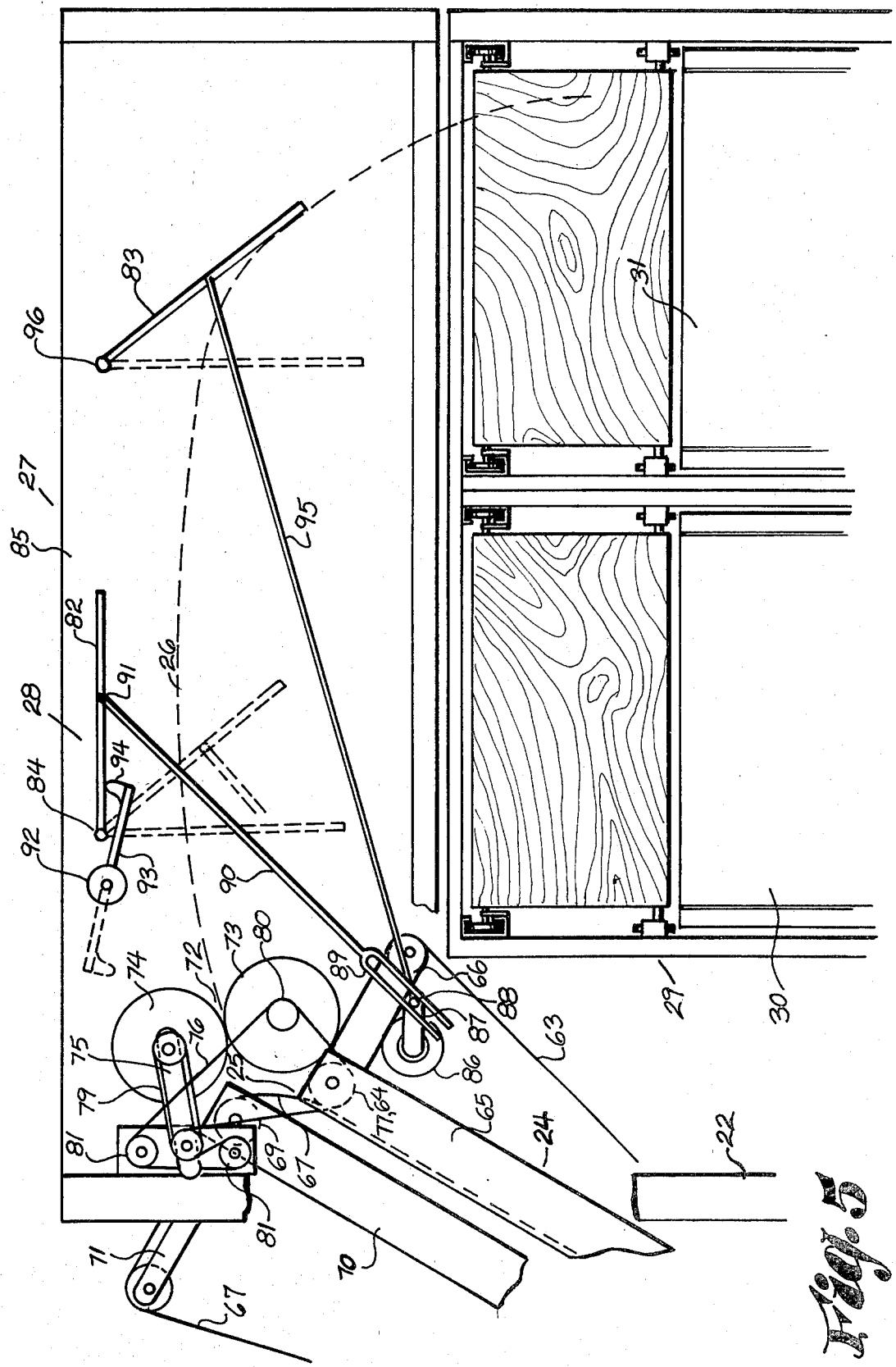

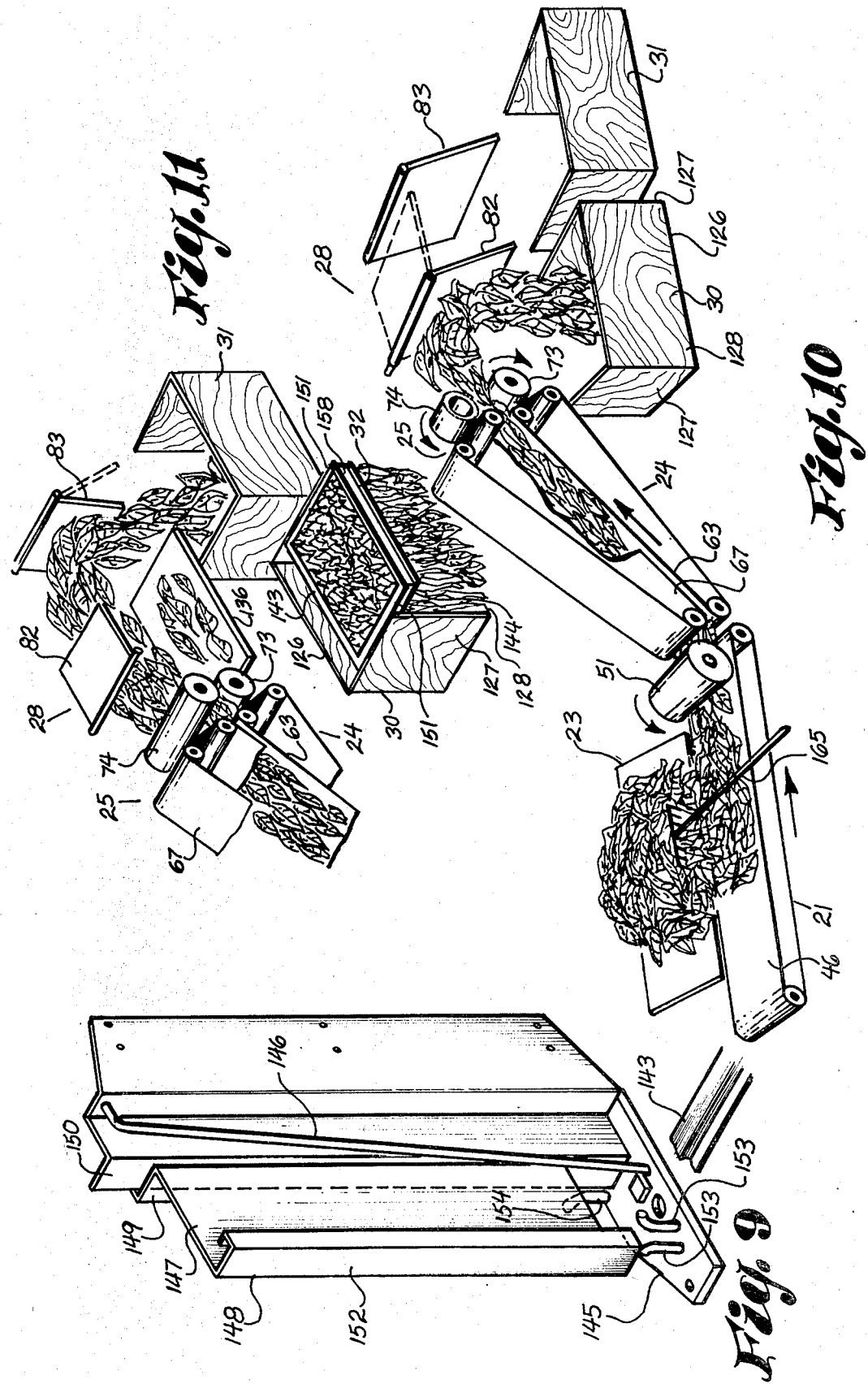

TOBACCO HANDLING APPARATUS

This is a continuation of application Ser. No. 949,407 filed Oct. 10, 1978, now abandonded, which in turn is a continuation of application Ser. No. 629,974 filed Nov. 7, 1975, now abandoned.

BACKGROUND OF THE INVENTION

The present invention relates to tobacco handling apparatus and more particularly to tobacco handling apparatus for transferring harvested tobacco leaves from a source to tobacco container means in preparation for support of the tobacco leaves during subsequent curing thereof.

Because of the thin, large area, irregular shape, lightweight and flaccid characteristics of tobacco leaves they have been difficult to handle mechanically and obtain any desirable uniform distribution satisfactory for racking for curing without some manual redistributing. Yet uniform distribution is essential in bulk curing of tobacco, which is otherwise adaptable to economical automatic processing, as the tobacco must be racked compactly without voids so that during bulk curing forced heated air will flow uniformly through the entire curing tobacco mass without flow concentration through voids.

Before the present invention, mechanical handling of tobacco prior to curing had evolved to the stage where tobacco leaves were mechanically harvested and loaded into trailers on combines and then transported to curing barns where the tobacco was manually removed from the trailers and loaded into racks. In some of these prior art operations the tobacco is mechanically fed into racks on combines with manual labor required to distribute the tobacco uniformly in the racks for proper bulk curing disposition.

In all of the known prior mechanical handling of tobacco into racks or trailers, the tobacco is discharged simply and directly into the trailers or racks with no control and without any significant horizontal extent to the flow. As a result, the trailers and racks have been disposed under the tobacco discharge, usually transverse thereto, and a laborer has been required to spread the tobacco outwardly from a central pile to uniformly fill the trailer or rack. In this stage of development and because of the unwieldly nature of tobacco leaves, it has not previously been considered possible to distribute tobacco leaves mechanically in an extended flow path with regulation to obtain uniform distribution into trailers or racks without manual handling.

Associated with the problem of the mechanization of the loading and distribution of tobacco in racks or other containers is the problem of indicating when a full load has been distributed, which is not a significant problem when a laborer is manually distributing the tobacco but is a problem when the system is mechanized or semi-mechanized to the extent that a laborer is not continuously observing the filling level. Also included in mechanization of such tobacco handling is the problem of closing racks or containers in a mechanical or semi-mechanical operation that facilitates closing and unloading of racks efficiently without disrupting the filling operation appreciably.

In contrast to the prior art, the present invention provides tobacco handling apparatus that includes mechanical distributing of the tobacco leaves uniformly into racks or containers in condition for subsequent bulk curing without requiring any manual redistributing, thereby enhancing the overall mechanization and providing an efficient and facile operation. Further, in conjunction with overall mechanization the present invention advantageously provides an automatic indication of full weight loading condition that facilitates controlling of the mechanical operation, and a rack closing and unloading arrangement that is efficient, facile and inexpensive to operate.

SUMMARY OF THE INVENTION

Briefly described, the present invention provides a tobacco handling apparatus for transferring harvested tobacco leaves from a source to tobacco container means in preparation for support of the tobacco leaves during subsequent curing. The apparatus includes conveyor means adapted to receive harvested tobacco leaves from a source and arranged for discharging the leaves from an end thereof in a flow path having a substantial maximum horizontal extent. Tobacco container means are disposed below the horizontal extent of the flow path and have an elongated horizontal extent aligned with and disposed underneath the maximum horizontal extent of the flow path for receipt of the tobacco leaves discharging from the conveyor means discharge end. The extent of the flow path is varied by means for varying the horizontal extent of the flow path within the maximum extent and over the elongated horizontal extent of the container means in a generally uniform manner to cause the leaves to be distributed substantially uniformly along the elongated extent of the tobacco container means, and means may be provided for confining the flow path to a predetermined width corresponding to the desired width of tobacco distribution in the tobacco container means.

Preferably the flow path varying means is deflecting means movable in the flow path, and is in the form of a baffle plate that is reciprocable or oscillatable in the flow path and may be combined with tobacco distributing rolls through the nip of which the tobacco leaves in the path pass for velocity and direction control thereby in the flow path.

In the preferred embodiment the container means comprises two tobacco containers disposed end-to-end in a row aligned with and underneath the flow path and having a combined horizontal extent in the direction of the flow path corresponding to the elongated horizontal extent of the container means. In this embodiment the means for varying the flow path extent has a component associated with each container and operable to distribute leaves selectively for alternate filling of the containers, with the component closest to the conveyor means being selectively movable to an inoperable position out of the flow path to allow filling of the other container. Operation of the movable component to inoperable position is in response to a predetermined weight of tobacco accumulating in the associated container and operation to operable position is in response to a predetermined weight of tobacco accumulating in the other container. These responses can be operable through an electrical signal to move the varying means component.

In an alternate embodiment of the container means, two tobacco containers are disposed in diametrically opposed relation on a selectively rotatable turntable for moving the containers to selectively position them alternately beneath the tobacco leaf flow path.

The tobacco containers of the various embodiments may each have an open top, a flat bottom wall, and a pair of opposed end walls extending upwardly from the ends of the bottom wall in perpendicular relation thereto with means in the form of vertically extending guide channels for vertical sliding receipt of a vertically disposed pin frame therebetween. These containers are selectively pivotable from the described position for loading wherein they receive tobacco leaves in horizontal disposition to a removal or unloading position at which the bottom wall is upright and the pin frame and guide channels are horizontal for sliding removal of the loaded pin frame from the container with the leaves vertically disposed for subsequent curing.

Pin frames may be inserted in the container means by means mounted on the apparatus for movement between an operable pin frame engaging and inserting position above the container means and an inoperable position out of the path of flow of tobacco leaves to the container means.

A stop plate may be mounted on the apparatus for movement between an obstructing position above the container means for obstructing the flow of tobacco leaves to the container means during removal of tobacco from the apparatus and an inoperable position out of the path of flow of tobacco leaves.

The source of tobacco leaves from which the apparatus transfers tobacco leaves may be a trailer having a flat bottom surface for supporting a supply of harvested tobacco leaves, and there are provided means for supporting the trailer adjacent the conveyor means and means for disposing the flat bottom surface at an inclination extending downwardly toward the conveyor means whereby the tobacco leaves can be readily transferred from the trailer to the conveyor means.

BRIEF DESCRIPTION OF THE DRAWINGS

FIG. 1 is a perspective view of a tobacco handling apparatus according to the preferred embodiment of the present invention;

FIG. 2 is a side elevation of the apparatus of FIG. 1, with the panels of the conveyor and distributing sections removed;

FIG. 3 is an end elevation of the apparatus of FIG. 1;

FIG. 4 is a plan view of the apparatus of FIG. 1;

FIG. 5 is an enlargement of the upper end of the conveyor, the distributing mechanism, and the tobacco container arrangement therebelow;

FIG. 6 is a side elevation of the tobacco container arrangement of the apparatus of FIG. 1, with the right half of the arrangement broken away for interior illustration;

FIG. 7 is an end elevation view of the tobacco container arrangement of FIG. 6;

FIG. 8 is a view similar to FIG. 7, partially in section, showing the pin frame engaging and inserting mechanism in operation, and showing the pivoted unloading position of a tobacco container in light-lines;

FIG. 9 is an enlarged perspective of the interior of one of the containers of FIGS. 6-8 at the location of one set of pin frame positioning elements and the associated pin frame guide channel;

FIG. 10 is a diagrammatic perspective view of the apparatus of the preceding figures in operation and showing the first tobacco container being loaded;

FIG. 11 is a view similar to FIG. 10, showing only the right-hand portion thereof and showing the first container being unloaded and the second container being loaded;

DESCRIPTION OF THE PREFERRED EMBODIMENTS

Figure 12:
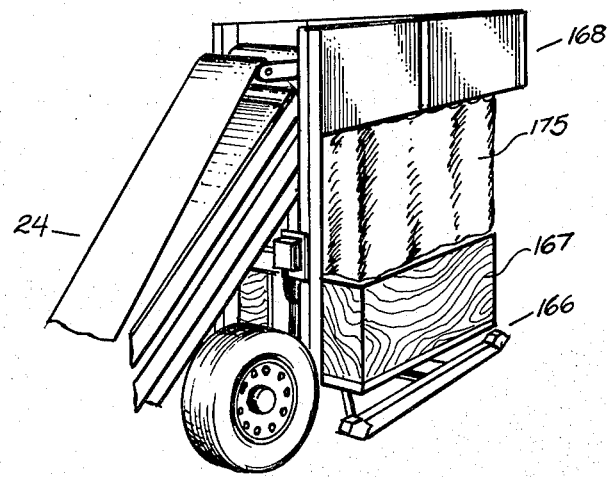
FIG. 12 is a perspective view of the right-hand portion of a tobacco handling apparatus incorporating an alternative embodiment of the present invention.
Figure 13:
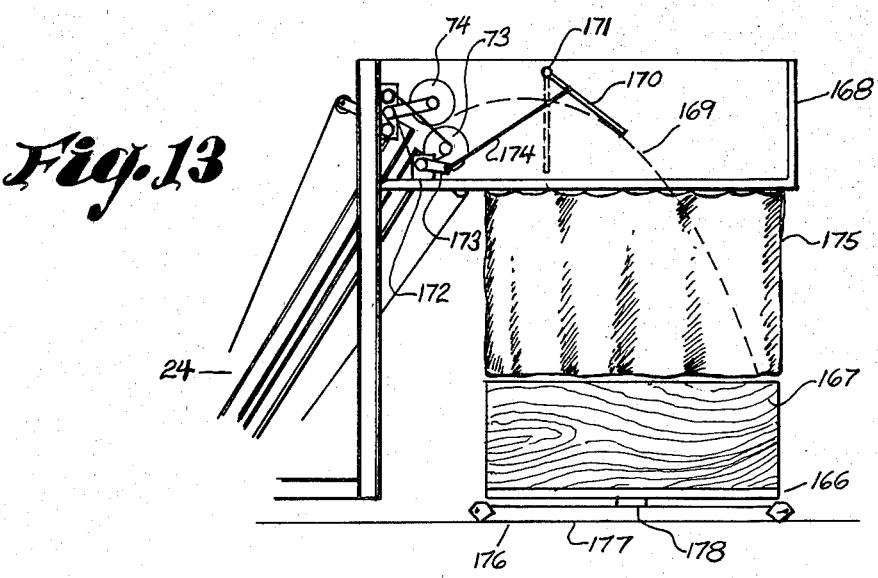
FIG. 13 is a side elevation of the apparatus of FIG. 12 with the side panel of the distributing section removed.
Figure 14:
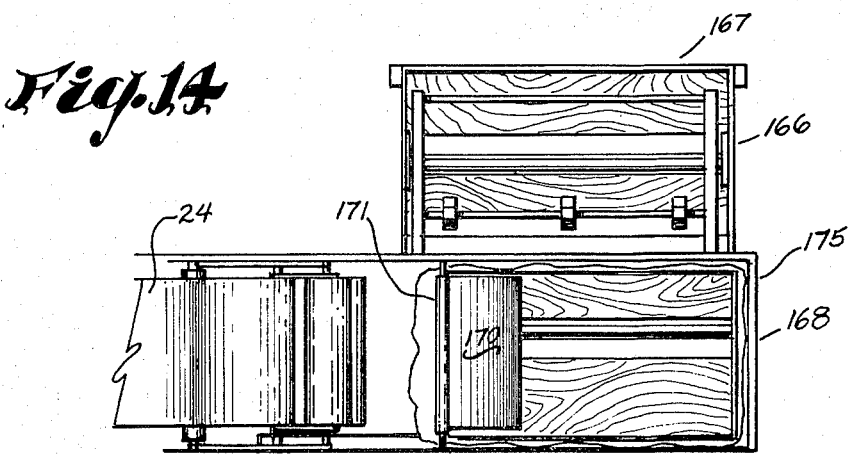
FIG. 14 is a plan view of the apparatus of FIG. 12.
Figure 15:
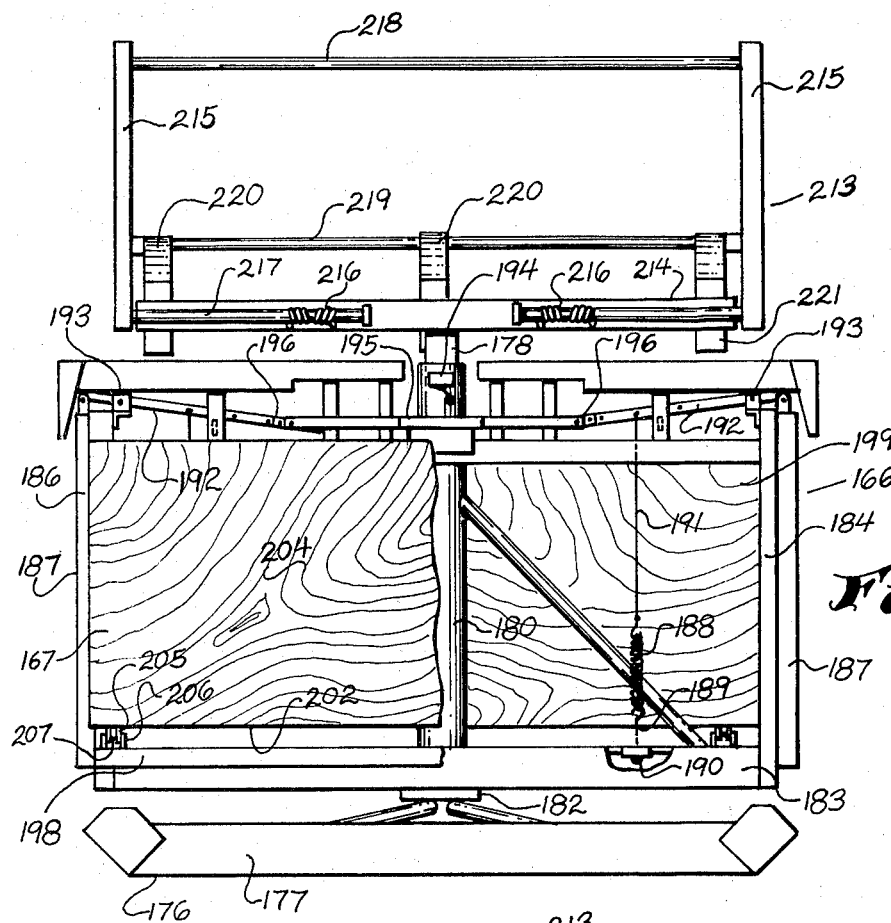
FIG. 15 is a front elevation of the tobacco container arrangement of the apparatus of FIG. 12, shown partially broken away at the right-hand half for illustration of interior elements.
Figure 16:
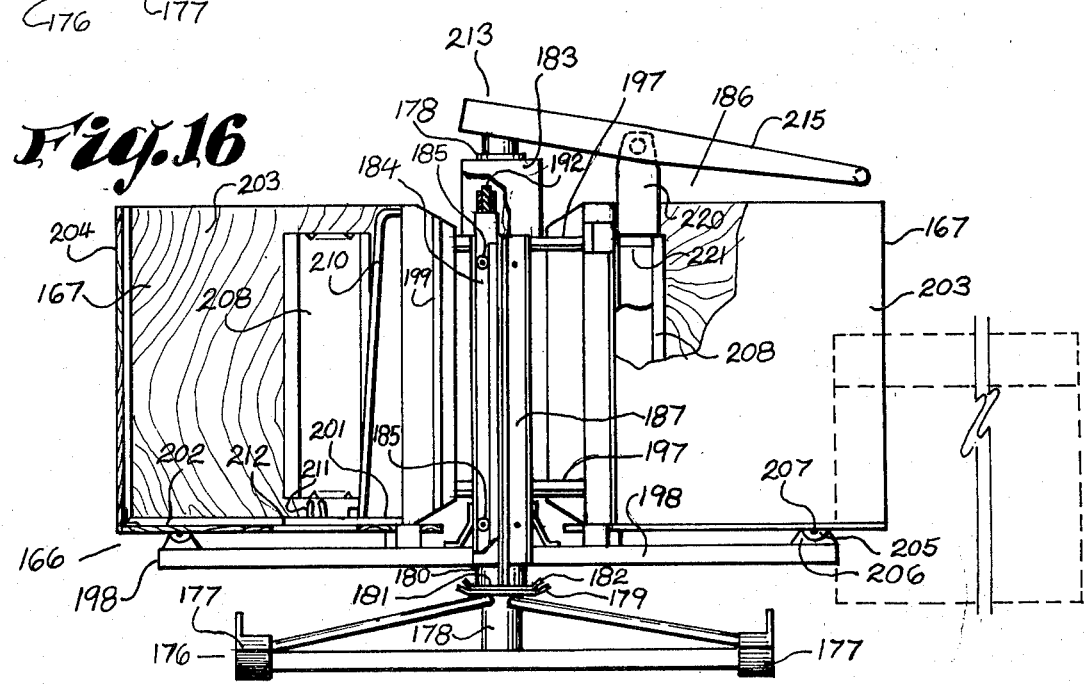
FIG. 16 is an end elevation of the tobacco container arrangement of FIG. 15 partially broken away for illustration of interior elements, showing the rack closing leverage applying mechanism in operating position and showing in light-lines the pivoted unloading position of the container at the right.
Figure 17:
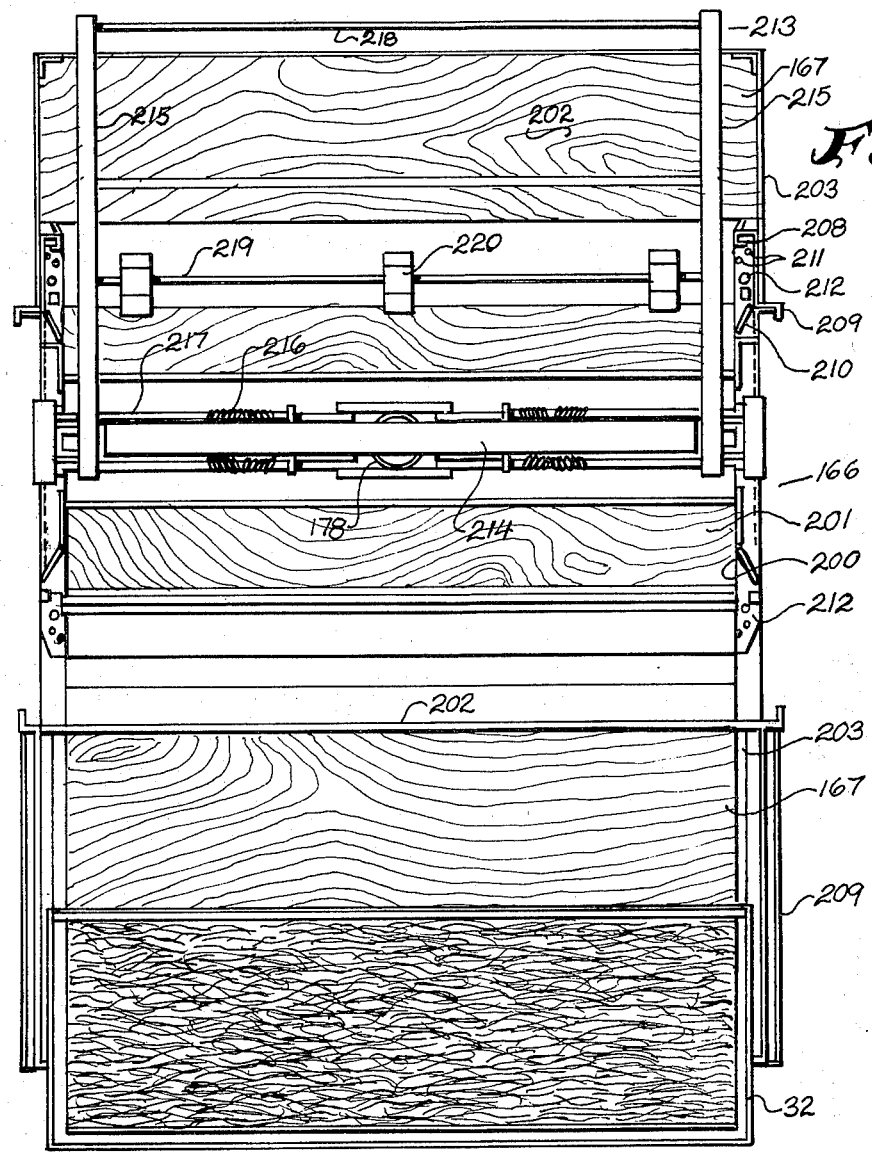
FIG. 17 is a plan view of the tobacco container arrangement of FIGS. 15 and 16 with the container at the bottom of the figure pivoted outwardly for unloading of a filled tobacco rack therefrom.

Referring to the drawings, and first to the embodiment of FIGS. 1-11, the tobacco handling apparatus 20 of the preferred embodiment of the present invention includes a horizontal conveyor section 21 mounted on a frame 22 for receiving harvested tobacco leaves from a trailer 23 and conveying the leaves to an inclined conveyor section 24 that is also mounted on the frame 22. The inclined conveyor section 24 elevates the tobacco leaves to a discharge end 25 from which the leaves are discharged in a flow path 26 (FIG. 5) having a substantial maximum horizontal extent within a distributing section 27 in which a distributing mechanism 28 operates to vary the horizontal extent of the flow path 26 within its maximum extent uniformly for falling discharge of the tobacco into a container arrangement 29 having two tobacco containers 30, 31 disposed in end-to-end alignment under the flow path 26 with an elongated horizontal extent for receipt of discharging tobacco from the distributing section 27 in substantially uniform distribution along the elongated extent of the tobacco containers 30, 31. The collected tobacco is removed from the containers 30, 31 in conventional tobacco racks 32 (FIG. 11) in which they are placed in a barn for subsequent bulk curing.

In the particular embodiment illustrated the tobacco handling apparatus 20 is intended to be used adjacent a bulk curing barn with harvested tobacco leaves being brought to the apparatus in trailers 23 and the apparatus being movable from barn to barn and from location to location on a pair of wheels 33 mounted on the frame 22 below the inclined conveyor section 24. For this purpose the frame 22 supports the horizontal conveyor section 21, the inclined conveyor section 24, and the distributing section 27, and has a tongue 34 extending from the outer end of the horizontal conveyor section 21 for engagement by a tractor or other pulling vehicle.

The trailer 23 resembles a conventional tobacco trailer in size and shape, having a pair of wheels 35 mounted in the center of a frame 36, which frame has a tongue 37 extending from one end for attachment to a tractor or other pulling vehicle and which tongue, along with the wheels 33, support the trailer 23 adjacent the horizontal conveyor section 21. The bin or container portion 38 of the trailer 23 is pivoted along one longitudinal edge on the frame 36 for pivoting by a pneumatic or hydraulic piston cylinder mechanism 39 that has one end mounted on the trailer frame 36 and its other end attached to the underside of the bin or container portion 38 so that upon extension of the piston cylinder mechanism 39 the bin or container portion 38 will be pivoted in the direction of the horizontal conveyor section 21 to facilitate removal of tobacco leaves therefrom. The side of the bin or container portion 38 adjacent the horizontal conveyor section 21 is formed by two panels that extend the full length of the side. The upper panel 40 is the larger of the two and is removably held in place during loading of the trailer 23 by brackets 41 on the ends of the bin portion 38 and brackets 42 on the upper panel 40 that straddle the lower panel 43, which is also attached to the ends of the bin portion by brackets 44 and is pivoted to the bottom edge of the bin portion 38 by hinge assemblies 45. With this panel arrangement, the larger upper panel 40 is first removed from the bin portion 38 to provide access to the tobacco leaves in the upper part of the bin portion 38, and after partial unloading of the tobacco leaves the lower panel 43 is released for pivoting downwardly to allow access to the remainder of the tobacco leaves in the bin portion 38.

Rather than using a pivoting trailer 23 of the type described hereinabove, a conventional trailer without pivoting capability may be used by providing a ram or jack for lifting the outboard side of the trailer to effect tilting comparable to the pivoting of the trailer described above, or an uneven ramp may be used for support of a conventional trailer thereon adjacent the horizontal conveyor section 21 with the outboard section of the ramp being elevated to effect comparable tilting of the trailer.

The horizontal conveyor section 21 includes a conveyor belt 46 trained around an idler roll 47 mounted on the frame 22 at the forward end of the apparatus and around a driven roll 48 mounted on the frame 22 adjacent the inclined conveyor section 24. A vertical front panel 49 is secured to the frame 22 adjacent the conveyor belt 45 on the side opposite the location of the trailer 23 and projecting upwardly beyond the level of the belt 46 to retain tobacco on the belt as the tobacco is being conveyed through the horizontal conveyor section 21. Similarly a back panel 50 is secured to the frame 22 and projects upwardly adjacent the side of the belt at which the trailer 23 is located. This back panel 50 is inclined outwardly toward the trailer to facilitate passage of tobacco thereover from the trailer 23 and to receive the lower panel 43 of the trailer 23 thereon when the lower panel is pivoted downwardly to allow emptying of tobacco from the bottom of the trailer.

To maintain the tobacco under the conveying influence of the belt 46 as the tobacco passes from the horizontal conveyor section 21 to the inclined conveyor section 24 without appreciable slippage and non-conveyance of the upper tobacco leaves on the belt 46, an auxiliary feed roll 51 is mounted across the belt 46 adjacent the inclined conveyor section 24 on a pair of pivot arms 52 pivotably secured to the frame 22 for extension generally horizontally away from the inclined conveyor section 24 for support of the auxiliary feed roll 51 between the free ends of the arms 52. In this manner the auxiliary feed roll 51 rides on the tobacco leaves on the conveyor belt 46 and is free to move upwardly to accommodate varying thickness of the mass of tobacco leaves passing thereunder. The weight of the auxiliary feed roll 51 on the tobacco leaves increases the friction engagement of the leaves by the belt 46 to facilitate uniform conveyance of the leaves and this is further facilitated by the auxiliary feed roll 51 being driven through a chain 53 that is trained around a sprocket 54 attached to the auxiliary feed roll 51 and a sprocket 55 mounted on the frame 22 concentrically with the pivot attachment of the arms 52.

The auxiliary feed roll 51 and the conveyor belt 46 are driven at approximately the same surface speed through a chain connection from a main drive motor 56. As seen in FIG. 2, the drive motor 56 operates a drive chain 57 that is trained around a sprocket 58 on the driven roll 48 of the horizontal conveyor section 21, around a sprocket 59 that drives the sprocket 55 for the auxiliary feed roll 51, and around idler rolls 60 mounted on the frame 22 to provide proper purchase of the drive chain 57 on the various sprockets. The drive chain 57 is also connected to a drive sprocket 61 that drives the lower roll 62 of the inclined conveyor section 24, which will be described presently.

The inclined conveyor section 24 has a main conveyor belt 63 trained around the aforementioned lower roll 62 at the same general level as the conveyor belt 46 of the horizontal conveyor section 21. This main conveyor belt 63 then extends upwardly and is trained around a main belt idler roll 64 at the upper discharge end 25 of the conveyor (FIG. 5). The lower roll 62 and upper roll 64 are mounted on inclined frame members 65, and an adjustable arm and roller assembly 66 projects from the inclined frame members 65 at the upper end thereof in a downward direction for training of the main conveyor belt 63 therearound to allow compensation for slack developing in the belt.

Tobacco is retained on the main conveyor belt 63 of the inclined conveyor section 24 for continuous conveyance upwardly to the top of the section by an auxiliary conveyor belt 67 that is trained around a driven roll 68 immediately above the lower roll 62 of the main conveyor belt 63 and concentrically connected to the aforementioned sprocket 55 for the auxiliary feed roll 51 of the horizontal conveyor section 21 for driving of the auxiliary conveyor belt 63 by the aforementioned chain 57 and drive motor 56. This auxiliary conveyor belt 67 extends upwardly from the driven roll 68 in facing relation to the main conveyor belt 63 to an idler roll 69 (FIG. 5) immediately above the main belt idler roll 64. The auxiliary conveyor belt driven roll 68 and idler roll 69 are mounted on inclined frame members 70 that are adjustably mounted on the frame 22 to vary the spacing of the auxiliary conveyor belt 67 from the main conveyor belt 63 to best suit operating conditions. For example, the adjustment can be arranged to vary the spacing from a minimum of three inches to a maximum of six inches, or any other suitable arrangement.

The tension of the auxiliary conveyor belt 67 is adjusted by an adjustable arm and roller assembly 71 that projects perpendicular to and generally upwardly from the upper end of the inclined frame members 70 for training of the auxiliary conveyor belt 67 therearound. The adjustable arm and roller assembly 71 is set to provide sufficient slack in the auxiliary conveyor belt 67 so that, while allowing the aforementioned spacing when there is tobacco between the main and auxiliary belts, 63 and 67, the auxiliary belt will be in contact with whatever tobacco leaves there are on the main conveyor belt 63 or in contact with the main conveyor belt itself when there are no leaves thereon. Thus, the auxiliary conveyor belt 67 maintains conveying engagement of the tobacco leaves on the main conveyor belt 63 to elevate the tobacco leaves through the inclined conveyor section 24. In the embodiment illustrated, the tobacco conveying uper reach of the main conveyor belt 63 of the inclined conveyor section 24 is inclined approximately 50° to 60° from horizontal, but the particular inclination may be varied as desired to effect the predetermined elevation within the selected horizontal extent.

The upper ends of the main conveyor belt 63 and the auxiliary conveyor belt 67 comprise the discharge end 25 of the inclined conveyor section 24 from which the tobacco leaves are discharged upwardly at generally the same inclination as the belts 63 and 67, from which discharge end the tobacco leaves pass into the nip 72 of a pair of distributing rolls 73 and 74 that are mounted on the frame 22 so that the nip 72 is immediately adjacent the belts 63 and 67 and in line with the tobacco leaves discharging from between the belts. The lower distributing roll 73 is rotatably mounted on the frame 22 in fixed position, and the upper distributing roll 73 is mounted on a pair of pivot arms 75 that are pivotally mounted on the frame 22 to permit vertical movement of the upper distributing roll 74 away from the lower distributing roll 73 to accommodate varying thicknesses of the mass of tobacco leaves passing through the nip 72.

Both of the distributing rolls 73 and 74 are driven by a chain 76 driven off the main belt roll 64 of the inclined conveyor section 24. To accomplish this the chain 76 is trained around a sprocket 77 fixed to the main belt roll 64 and then around a sprocket 78 mounted on one of the pivot arms 75 at the pivot axis thereof for driving of the upper distributing roll 74 through a chain connection 79. The main chain 76 also is trained around a sprocket 80 on the lower distributing roll 73 after passing around a pair of idler rolls 81 located to provide the main chain 76 with a configuration that effects rotation of the lower and upper distributing rolls 73 and 74 in opposite directions with the surfaces of the rolls traveling in the same direction at the nip 72. The direction of rotation of the rolls 73 and 74 is such that the surfaces at the nip 72 are moving in a direction away from the inclined conveyor section 24 toward the distributing section 27 to direct the leaves into the distributing section 27 in the flow path 26, which has a substantial maximum horizontal extent produced by the speed of the distributing rolls 73 and 74 and by the slight upward leaf discharging inclination of the tangent of the nip 72 of the rolls 73 and 74. This nip inclination in the embodiment illustrated is approximately 11°, but can be varied for particular results desired by adjusting or changing the pivot arms 75 to move the upper distributing roll 74 forwardly or rearwardly with respect to the lower distributing roll 73 to change the nip location. In the embodiments illustrated, the maximum horizontal extent of the flow path 26 may be as much as 10 feet or more depending upon the length of the tobacco container arrangement 29 located therebelow to receive tobaccco falling from the flow path 26.

The horizontal extent of the flow path 26 is varied within the maximum range in the distributing section 27 for distribution of tobacco leaves generally uniformly in the tobacco containers 30 and 31 therebelow.

In the preferred embodiment illustrated in FIG. 5, the horizontal extent of the flow path 26 is varied by the distributing mechanism 28 that includes a pair of deflectors in the form of a front baffle plate 82 and a rear baffle plate 83, both of which are capable of oscillation in the flow path 26 over the front tobacco container 30 and rear tobacco container 31, respectively. The front baffle plate 82 is mounted at its upper end to a pivot shaft 84 that extends transversely to and above the flow path 26, having its ends pivotally mounted in the side panels 85 of the distributing section 27. The front baffle plate 82 hangs from the shaft 84 and is oscillated from a generally vertical disposition to a substantially inclined rearward disposition as indicated by the light lines in FIG. 5. Oscillation of the front baffle plate 82 is accomplished by an electric motor 86 mounted on the frame 22 and rotating a crank arm 87 having a pin connection 88 at its free end for straddling thereon of the forked end 89 of a connecting rod 90 that has its other end 91 pivotally connected to the front baffle plate 82 intermediate its ends. The lengths of the crank arm 87 and connecting rod 90 in relation to the connection to the front baffle plate 82 is such that rotation of the crank arm 87 will cause oscillation of the front baffle plate 82 through the arc that extends between the aforementioned front and rear positions of the front baffle plate 82. When this oscillation is taking place, the tobacco leaves in the flow path 26 strike the baffle plate and are directed downwardly thereby into the front tobacco container 30. In this way when the front baffle plate 82 is in its forward generally vertical disposition the tobacco leaves will strike the plate and fall generally vertically down into the front portion of the tobacco container 30 and as the plate moves rearwardly the tobacco leaves will fall farther rearwardly in the container until the plate is in its rearward most position at which the tobacco leaves will be deflected downwardly with some residual horizontal component into the rear of the front tobacco container 30.

The front baffle plate 82 is selectively pivotable rearwardly and upwardly to a generally horizontal position out of the flow path 26 of the tobacco leaves so that the tobacco leaves can travel in the flow path for contact with the rear baffle plate 83 and distribution thereby into the rear tobacco container 31. Movement of the front baffle plate 82 to its horizontal inoperative position is accomplished by a motor 92 that rotates a control arm 93 through a predetermined arc from a lower position in which it is out of contact with the oscillating front baffle plate 82 and a raised position in which a plate engaging element 94 thereon engages the front baffle plate 82 and holds it in its horizontal inoperative position. The forked end 89 of the connecting rod 90 is elongated sufficiently to remain engaged in the pin connection 88 to accommodate rotation of the crank arm 87 without oscillation of the front baffle plate 82 when the plate is in its raised inoperative position.

Energization of the motor 92 to raise the front baffle plate 82 to its inoperative position is accomplished in response to an indication that a predetermined weight of tobacco has been received in the front tobacco container 30 and de-energization of the motor 92 to allow the front baffle plate 82 to move to its lower operative position is accomplished in response to an indication that a predetermined weight of tobacco has been received in the rear tobacco container 31.

The rear baffle plate 83 is similarly fixed to a shaft 96 that extends transverse to and above the flow path 26 with its ends pivotally mounted in the side panels 85 of the distributing section 27 above the front portion of the rear tobacco container 31 and from which the rear baffle plate 83 depends for oscillation. Also, the rear baffle plate 83 is connected to the crank arm 87 through a connecting rod 95 that is pivotally connected to both the crank arm 87 and the rear baffle plate 83. No forked end connection is needed as in the front baffle plate connection as the rear baffle plate 83 may oscillate continuously even when the front baffle plate 82 is in operation and no tobacco is reaching the rear baffle plate 83. The arc of oscillation of the rear baffle plate 83 extends from a generally vertical position to a rearward substantially inclined position as indicated in FIG. 5. In the generally vertical position the plate is above the front portion of the rear tobacco container 31 so that tobacco striking the plate will fall downwardly into the front portion of the container and the rearward location of the plate is at such an angle that the tobacco in the flow path 26 striking the plate will be deflected downwardly with the inertia of the tobacco leaves causing them to continue to the rear portion of the rear tobacco container 31.

Figure 18:
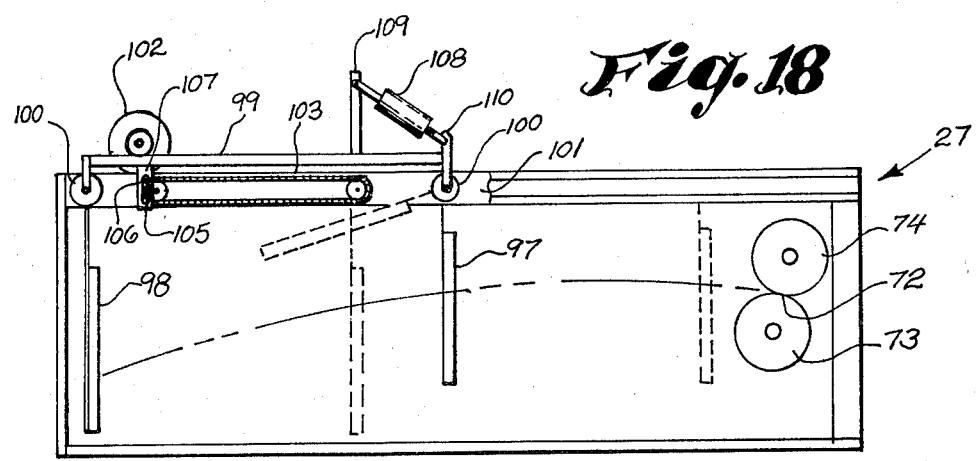
FIG. 18 is a side elevation of a modified form of the distributing mechanism of the apparatus of the embodiment of FIGS. 1-11.

An alternate embodiment of the baffle plate type of means for varying the flow path to distribute tobacco leaves uniformly and selectively in end-to-end tobacco containers is illustrated in FIG. 18. In this embodiment the same components are used throughout the apparatus as in the embodiment of FIGS. 1-11, except for the arrangement of baffle plates in the distributing mechanism. Thus, tobacco leaves are discharged into the distributing section 27 by lower and upper distributing rolls 73 and 74 in the same manner as in the previously described embodiment to project the tobacco leaves in the same flow path 26 as in the preceding embodiment. However, rather than using oscillating baffle plates 82 and 83 as in the preceding embodiment, the embodiment of FIG. 18 utilizes reciprocating baffle plates 97 and 98 mounted on a carriage 99 that is reciprocally mounted on the frame 22 in the distributing section 27 by guide rollers 100 mounted on the carriage 99 and supported in and rollable along horizontal guide channels 101 mounted on the frame 22 along the top of the distributing section 27. The carriage 99 is reciprocated by a drive motor 102 mounted on the frame 22 and which drives a chain 103 that is trained around a pair of sprockets 104 spaced horizontally on the frame 22. The chain carries a laterally projecting pin 105 that rides in a slot 106 of an arm 107 depending from the carriage 99. The slot 106 is of sufficient vertical extent to accommodate the pin as it follows the upper and lower reaches of the chain 103 and around the sprockets 104. Thus, as the chain 103 moves in a continuous path it will effect reciprocation of the carriage 99.

One of the baffle plates 97 is located at the front of the carriage 99 and depends therefrom into the flow path 26 of the tobacco leaves above the front tobacco container, identified by the numeral 30 in FIG. 5. This front baffle plate 97 is in a vertical disposition during operation thereof and moves from a position adjacent the front portion of the front tobacco container to a position adjacent the rear portion of the front tobacco container, which stroke of reciprocation is determined by the extent of the chain 103 that reciprocates the carriage 99.

The front baffle plate 97 is mounted for pivoting rearwardly and upwardly out of the tobacco flow path 26 to an inoperative position in which the tobacco leaves follow the flow path for distributing operation by the rear baffle plate 98, which is fixed in its vertical disposition on the carriage 99 and continues to reciprocate with the carriage during distribution of leaves into the rear tobacco container, indicated by the numeral 31 in FIG. 5, as well as during distributing of the tobacco leaves by the front baffle plate 97 into the front tobacco container. The rear baffle plate 98 is located on the carriage 99 so that it reciprocates between a forward position in which it distributes tobacco leaves in the front portion of the rear tobacco container and a position in which it distributes tobacco leaves to the rear portion of the rear tobacco container.

Movement of the front baffle plate 97 from its operative position, shown in solid lines in FIG. 18, to its inoperative position, shown in light-lines in FIG. 18, is accomplished by a hydraulic piston-cylinder mechanism 108 mounted on the carriage 99 with one end pivoted to an upstanding arm 109 secured to the carriage 99 and its other end pivoted to an operating arm 110 connected to the front baffle plate 97. Extension of the piston-cylinder mechanism 108 pivots the operating arm 110 forwardly and downwardly and, thereby, pivots the front baffle plate 97 rearwardly and upwardly. Actuation of the piston-cylinder mechanism 108 is effected in response to indications of a predetermined weight of tobacco accumulated in the tobacco containers so that when a predetermined weight of tobacco has accumulated in the front container the piston-cylinder mechanism 108 will be actuated to pivot the front baffle plate 97 to its inoperative position, discontinuing distribution of tobacco to the front tobacco container and permitting distribution of tobacco to the rear tobacco container with the rear baffle plate 98 distributing the tobacco uniformly over the rear tobacco container. The piston-cylinder mechanism 108 remains actuated until a predetermined weight of tobacco has been accumulated in the rear tobacco container, in response to which the piston-cylinder mechanism 108 will be reversed to pivot the front baffle plate 97 back to its operative position to begin distribution of tobacco to the front tobacco container.

The tobacco container arrangement 29 disposed below the distributing section 27 and containing the aforementioned tobacco containers 30 and 31 for receiving the uniformly distributed tobacco leaves from the baffle plates 82 and 83 of the distributing mechanism 28 of the embodiments of FIGS. 1-11 and 18 includes a base 111 having spaced longitudinal outer runners 112 with upturned ends to allow sliding of the container arrangement 29 along the ground, and front and rear transverse cross members 113 and two intermediate transverse cross members 114 secured t the longitudinal runners 112 at spacings sufficient to provide corner support for supporting enclosures 115 for each the front tobacco container 30 and rear tobacco container 31. This support is provided through upstanding helical compression springs 116 at each corner of each supporting enclosure 115, with the lower ends of the springs supported on the cross members 113, 114 and the upper ends supporting the ends of transverse cross members 117 on the underside of the supporting enclosures 115. The springs 116 are centered by bolts 118 extending through the cross members 117 of the supporting enclosures 115 and the transverse cross members 113 and 114 of the base 111, with nuts 119 on the bolts 118 below the cross members 113 and 114 for tightening the bolts to precompress the springs 116 while allowing further compression. Cylindrical stop members 120 enclose each spring 116 to limit the downward compression of the springs and form a stop for limiting the downward movement of the supporting enclosures 115.

The compression spring support of the supporting enclosures 115 allows the enclosures to move downwardly under the weight of tobacco leaves being accumulated therein during operation of the apparatus 20 for the purpose of weighing the amount of tobacco being accumulated and to provide the aforementioned indication of the accumulation of a predetermined amount of tobacco in each of the containers 30 and 31. To provide this indication, a switch operating finger 121 depends from the underside of each of the supporting enclosures 115 at an initial spacing above the actuating element of an electrical switch 122 mounted on the base 111. Each switch 122 is adjustable to be actuated by the associated switch operating finger 121 when the associated supporting enclosure 115 moves downwardly under the weight of a preselected amount of tobacco accumulating in the respective containers 30 and 31 and the output of the associated switch 112 is utilized to actuate the aforementioned motor 92 to rotate the control arm 93 that moves the front baffle plate 82 of the embodiment of FIGS. 1-11 to its inoperative or operative position, as described hereinabove. Each switch 122 acts similarly to operate the piston-cylinder mechanism 108 of the embodiment of FIG. 18. The actual wiring (not shown) which extends to each switch 122 and is connected within the control circuit either for the motor 92 or mechanism 108 must, of course, accommodate the separation between distributing section 27 and container arrangement 29.

Each of the supporting enclosures 115 includes as structural elements the aforementioned transverse cross members 117, one along the front and one along the rear of the bottom of the enclosures, a longitidually extending angle bar 123 secured to the underside of each of the cross members 117 and extending therebetween at an inset from the face of the enclosure, and four upstanding corner posts 124 secured to the cross members 117 and connected at their upper ends by longitudinal framing bars 125. Each of the supporting enclosures 115 pivotally supports one of the tobacco containers 30 or 31 in an upright position. These containers 30 and 31 each have a flat bottom wall 126 extending slightly less than the full length of the associated supporting enclosure 115, front and rear end walls 127 that are secured to and extend upwardly perpendicular to the bottom wall 126, and a side wall 128 secured to the bottom, front and rear walls 126, 127 and extending perpendicular thereto for forming a portion of the face of the supporting enclosure 115. This container has inverted channel members 129 extending transversely under the bottom wall 126 along the front and rear ends thereof for pivoting support of the container through pivot pins 131 secured longitudinally at a spacing from the side face of the supporting enclosure 115 and extending longitudinally in pivoting engagement in the channel members 129 and in channel brackets 132 projecting from the longitudinal angle bars 123, with the channel members 129 and channel brackets 132 straddling each other to form a relative pivoting connection through the mutually supported pins 131. By this arrangement the container 30 or 31 can be disposed in its upright normal position during accumulation therein of tobacco from the distributing section 27, and when filled, the container can be pivoted outwardly to dispose the open top thereof in side facing disposition to allow easy removal of the tobacco from the container as will be more fully described hereinbelow.

To direct the falling tobacco to the tobacco containers and to confine the accumulating tobacco in containers, the support enclosures 115 include front and rear panels 133 and a back side panel 134 secured to and extending between the corner posts 124. The back side panel 134 is spaced backwardly from the associated container 30 or 31 to provide space for disposition of portions to tobacco leaves beyond the container walls and the front and rear panels 133 extend backwardly also for this purpose while otherwise being disposed closely outward of the end walls of 127 of these containers. Further a stationary partial bottom panel 135 is formed in the supporting enclosure 115 backwardly of and as an extension of the bottom wall 126 of the associated container 30 or 31.

A movable side panel 136 is mounted on each of the supporting enclosures 115 between corner posts 124 above the side wall 128 of the associated container 30 or 31. This movable side panel 136 normally forms an enclosure for the tobacco container arrangement 29 to confine tobacco so that it falls into the container or is confined thereabove prior to compression of the tobacco before it is removed from the container. This side panel 136 is movable out of its normal vertical position to allow pivoting of the container as described hereinabove and to form a horizontal stop plate across the top of the supporting enclosure 115 to prevent tobacco from falling into the enclosure during unloading of the container and to accumulate any tobacco that might fall from the distributing section 27 thereon until the container is repositioned for receiving tobacco. This movement of the side panel 136 is accomplished by providing horizontally extending transverse C-shaped channel members 137 at the top of the supporting enclosures 115 with the channel members facing each other to expose their open slots for sliding therealong of shafts 138 projecting longitudinally from the top and bottom corners of the side panel 136. Discs 139 are secured to the ends of the shafts 138 and are of a size to fit within the channel members 138 while being larger than the slots so that they will be retained in sliding disposition therein. In the vertical hanging position, the side panel 136 has the discs 139 at the top positioned in the channel members 137 above the side wall 128 of the tobacco container 30 or 31 to form a portion of the enclosing structure and the lower end of the side panel 136 is retained against outward movement under pressure of accumulating tobacco by stop plates 140 projecting from the corner posts 124. Also, outward movement of the upper end of this side panel 136 is prevented by triangular cam elements 141 secured to the outer ends of the channel members 137 and projecting upwardly above the level of the shafts 138 to prevent outward movement thereof. These cam elements 141 have inclined surfaces 142 aligned with the shafts 138 to cause the shafts to ride up over the inclined surfaces 142 as the shafts enter the channel members, which are open at this location to accommodate this movement.

The inner ends of the channel members 137 terminate short of the back side panel 134 of the supporting enclosure 115 to allow the discs 139 to drop downwardly therefrom to position the movable side panel 136 in its vertical position. In this regard, the channel members 137 are longer than the spacing between the discs 139 so that the discs at the opposite edges of the side panel 136 will all be engaged in the channel members 137 before further movement will cause the inner discs to move free of the channel members 138 and allow the side panel 136 to pivot to its vertical position.

The tobacco received in the containers, 30 and 31, is secured in the aforementioned tobacco racks 32, which may be of any conventional construction. In the embodiment illustrated, the tobacco racks 32 each have a base plate 143 and a pin frame 144 of U-shaped construction with ends that latch to the base plate 143 to form a rectangular enclosure and which have tobacco piercing pins extending into the mass of tobacco enclosed therein. As seen in FIG. 9 the base plate 143 of the tobacco rack 32 is positioned in the bottom of one of the tobacco containers 30 or 31 prior to loading with tobacco. This base plate extends the length of the container and has ends positioned on plates 145 extending from the stationary bottom panel 135 of the supporting enclosure 115, which extends slightly under the front and rear end walls 127 of the container for this purpose, with the bottom wall 126 being recessed at these locations to accommodate the plates 145. The pin frames 144 are guided into proper position for latching with the base plates 143 by an inclined rod 146 extending from an offset in the front or rear panel 133 of the enclosure 115 to the base plate 143. This rod 146 is positioned to retain the inner end of a pin frame in proper vertical alignment with the end of the base plate 143, which alignment is also maintained in the opposite direction by the web 147 of a guide channel 148 extending vertically and secured to the front and rear end walls 127 of the containers 30 or 31. This guide channel 148 also has a vertical flange 149 facing a corresponding flange 150 on the associated front or rear panel 133 of the enclosure 115 for guiding receipt therebetween of the projecting flange 151 of the pin frame 144. This flange engagement maintains proper transverse alignment of the pin frame 144 with the base plate 143, which transverse alignment can be further maintained by an inwardly extending flange 152 on the guide channel 148 for engagement with the edge of the pin frame 144 opposite the flange 151 thereof. Final precise latching alignment of the pin frame 144 with the base plate 143 is accomplished by a pair of oppositely curving pins 153 projecting from the plate 145 extending from the bottom wall 135 for straddling of the pin frame 144 and guiding it finally into latching position. This final guiding is also facilitated by a curved pin 154 projecting from the plate 145 to assist in guiding the outer edge of the pin frame flange 151.

As the guide channel 148 is secured to the front or rear end wall 127 of the pivotable container 30 or 31, it will pivot with the container and be in a horizontally extending disposition upon full pivoting of the container. In this position, the inwardly extending flange 149 of the guide channel 148 will be underneath the rack 32 and will serve as a supporting guide to allow horizontal sliding removal of the filled rack. The pivoted position of the container 30 or 31 is determined by engagement of the aforementioned channel members 129 that project downwardly from the bottom wall 126 of the container 30 or 31 against the aforementioned longitudinal angle bar 123 that extends along the underside of the supporting enclosure 115. This engagement in relation to the location of the pivot pins 131 determines the pivoted location of the container 30 or 31, which is preferably with the side wall 128 horizontal and the rack guide channels 148 also horizontal.

The pin frames 144 may be manually inserted in the container 30 or 31 by an operator positioning the pin frames in vertical alignment with the guide channels 148 and then pressing downwardly until the pin frames are fully inserted and are latched with the base plates 143. In the embodiment illustrated, the initial insertion of the pin frames 144 is accomplished manually, but the final insertion, which requires considerable manual effort is accomplished by a hydraulically powered pin frame engaging and inserting mechanism 155 that is mounted on the base 111 of the tobacco container arrangement 29. This mechanism includes three lever arms 156 associated with each container 30 or 31. A cylindrical element 157 is mounted horizontally at the free end of each lever arm 156 for engagement in the recess 158 in the top of the pin frame 144. The other ends of the lever arms 156 are fixed to a horizontal tubular shaft 159 mounted for oscillation in upstanding posts 160 secured to and extending upwardly from the base 111 of the tobacco container arrangement 29 beyond the back side panel 134 thereof and located at the corners of the base 111 and also intermediate the ends of the base between the supporting enclosure locations. The lever arms 156 are normally disposed in vertical disposition beyond the back side panel 134 out of interference with tobacco falling into the container 30 and 31, and the arms associated with each container are oscillated into pin frame engaging and inserting horizontal position through accommodating slots 161 in the back side panel 134 by a pneumatic or hydraulic piston-cylinder mechanism 162 for each container and mounted centrally of the container beyond the back side thereof. One end of each piston-cylinder mechanism 162 is secured to the base 111 of the tobacco container arrangement 29 and the other end is secured to the end of an operating arm 163 projecting from the tubular shaft 159 so that upon extension of the piston-cylinder mechanism 162 the operating arm 163 will cause oscillation of the tubular shaft 159 and lever arms 156 for pin frame engaging and inserting operation. The pressure in the piston-cylinder mechanism 162 may be controlled so that the pressure will not exceed the resistance of the closed pin frame and the lever arms will not be forced beyond a normal pin frame closing stroke. Each piston-cylinder mechanism 162 is independently operated so that a pin frame can be inserted and latched in one container 30 or 31 while tobacco is being accumulated in the other container, with actuation of the piston-cylinder mechanisms 162 to close and latch the racks 32 being manually controlled by an operator through a conventional switch mounted at any convenient location.

Operation of the apparatus 20 of the embodiment of FIGS. 1-11 in handling tobacco from the trailer 23 and accumulating it in racks 32 begins by an operator actuating the switches that energize the drive motors, which switches are in a control box 164 on the frame 22. Base plates 143 of the racks 23 are then placed in the bottoms of the containers 30 and 31 in readiness for receipt of tobacco. The apparatus then operates as illustrated diagrammatically in FIGS. 10 and 11. Referring first to FIG. 10 tobacco leaves are shown being removed from the trailer 23 using a rake 165 with which an operator pulls leaves from the trailer onto the conveyor belt 46 of the horizontal conveyor section 21, which conveys the leaves under the auxiliary feed roll 51 to between the main conveyor belt 63 and auxiliary conveyor belt 67 of the inclined conveyor section 24, from which the leaves are discharged to the distributing rolls 73 and 74, which direct the leaves from the nip 72 thereof in the flow path 26 (FIG. 5), which is obstructed by the oscillating front baffle plate 82. The oscillation of this baffle plate causes the tobacco to fall in a generally uniform distribution throughout the length of the front tobacco container 30, while no tobacco passes therebeyond to the continuously oscillating rear baffle plate 83.

When the weight of tobacco accumulated in the front tobacco container 30 reaches a predetermined weight, the springs 116 will have compressed sufficiently to cause the switch operating finger 121 to close the switch 22 and, thereby, effect movement of the front baffle plate 82 to its inoperative position and allow the tobacco leaves to continue in the flow path to the rear baffle plate 83 as seen in FIG. 11. When this occurs, an operator raises the movable side panel 136 of the front supporting enclosure 115 to prevent inadvertent tobacco fall into the front enclosure. The operator then partially inserts a pin frame 144 into the front tobacco container 30 and then actuates the pin frame engaging and inserting mechanism 155 to complete the closing and latching of the tobacco rack 32. The operator then pivots the container to dispose the tobacco rack in horizontal disposition and removes the filled rack 32 by sliding it horizontally along the guide channels 148. In this horizontal disposition the rack is ready to be inserted in a bulk curing barn without further manipulation or reorientation, which is a decided advantage over prior racking arrangements where the vertically disposed rack must be reoriented to a horizontal disposition manually rather than being ready for immediate insertion into a curing barn. In this regard it should be noted that the tobacco leaves, in falling into the containers, settle individually in generally horizontal dispositions, and upon pivoting of the containers for removal of the racks the tobacco leaves are vertically disposed in proper position for subsequent curing.

After unloading of a filled tobacco rack, the front container 30 is pivoted back to its tobacco receiving position and another rack base plate 143 is positioned in the bottom of the container for receipt of tobacco thereon. The movable side panel 136 is then lowered to its vertical position, dumping any accumulated tobacco leaves into the container therebelow.

If the front tobacco container 30 is not in readiness to receive tobacco by the time that the rear tobacco container 31 is filled, the operator who is unloading tobacco leaves from the trailer onto the conveyor will discontinue this operation until the front tobacco container 30 is ready. In any event, when the rear tobacco container 31 has received its predetermined weight of tobacco, the aforementioned switch 122 associated with that container will actuate operation of the front baffle plate 82 into its operating position in the tobacco flow path 26. Racking of the tobacco in the rear tobacco container 31, pivoting of the container and sliding removal of the filled rack is then accomplished.

An alternative preferred embodiment of the present invention is illustrated in FIGS. 12-17, which is similar to the precedingly described preferred embodiment except that the tobacco container arrangement is in the form of a turntable 166 that is rotatable to position tobacco containers 167 alternately under the distributing section 168 rather than the precedingly described arrangement of two tobacco containers 30 and 31 arranged in end-to-end disposition with alternate filling being controlled by selectively operable baffle plates of the aforedescribed distributing mechanism 28. As in the preceding embodiment, the containers 167 of this alternative embodiment are disposed endwise to the flow path 169 to provide an elongated extent over which the tobacco is uniformly distributed.

As the horizontal conveyor section and inclined conveyor section of the alternative embodiment of FIGS. 12-17 are identical to that of the aforedescribed embodiment of FIGS. 1-11, they are not illustrated or described in relation to the alternative embodiment, except to show the upper end of the inclined conveyor section 24 which feeds tobacco leaves to the distributing rolls 73 and 74 for projecting them in a flow path 169 having a substantial maximum horizontal extent sufficient to extend throughout the length of the distributing section 168. As this section is long enough to accommodate only one tobacco container 167 rather than the two tobacco containers 30 and 31 of the precedingly described embodiment, the speed or inclination of the distributing rolls 73 and 74 may be varied accordingly although this is not necessry as distribution of the tobacco is controlled to vary the extent of the flow path for uniform distribution of tobacco to the tobacco containers 167 by an oscillating baffle plate 170 similar to the front baffle plate 82 of the precedingly described embodiment. This oscillating plate 170 depends from a pivot shaft 171 secured transversely in the distributing section 168 above the tobacco flow path 169 to allow oscillation of the baffle plate 170 in the flow path 169, which oscillation is accomplished by an electric motor 172 mounted in the distributing section 168 for rotating a crank arm 173 that has an outer end to which one end of a connecting rod 174 is attached. The other end of the connecting rod 174 is connected to the baffle plate 170 to effect oscillation thereof upon rotation of the crank arm 173, with the oscillation being between a substantially vertical position, as shown in light-lines in FIG. 13, above the front portion of the tobacco container 167 for distribution of tobacco into the front portion of the container and a rearwardly inclined position, as shown in solid lines in FIG. 13, in which the baffle plate deflects the tobacco from the flow path 169 to the rear portion of the tobacco container 167. To confine the falling tobacco within the periphery of the tobacco containers 167, a fabric curtain 175 hangs from the underside of the distributing section 168 to the tobacco container 167.

The turntable 166 has a base 176 with runners 177 having upturned ends for support of the turntable on the ground while allowing for sliding of the turntable from one location to another. The base is formed with an upstanding center post 178 on which a support plate 179 is secured adjacent its lower end. Mounted for rotation on the post 178 is a cylindrical support tube 180 that has a base plate 181 mounted on its lower end and supported on the support plate 179. The support plate 179 and base plate 181 have corresponding upturned edges 182 along opposed sides thereof for retaining the cylindrical support tube 180 in one of two diametrically opposed positions for alternate alignment of the tobacco containers 167 under the distributing section 168. The cylindrical support tube is the sole support for a frame 183 that extends laterally therefrom through the center of the turntable and has secured thereto at each laterally outward extent thereof a pair of side-by-side outwardly facing cantilever support channels 184, in each of which two vertically spaced rolls 185 are positioned for vertically movable cantilever support of tobacco receiving enclosures 186 on opposite sides of the frame 183, which enclosures include the tobacco containers 167.

The rolls 185 are secured to upstanding side bars 187 of the enclosures 186 through which the enclosures are cantileverly supported. The enclosures 186 are maintained in a vertical position above the base 176 by pairs of coil springs 188 that have their lower ends secured through a lower hook 189 in the frame 183 and adjustable therein to vary the supporting position of the enclosures 186 by a nut 190 threaded on the lower hook 189 below the frame 183. The upper end of each spring 188 is connected through an upper hook 191 to a lever arm 192 that is pivoted intermediate its ends in a bracket 193 on the frame 183 and has its other end pivoted to one of the side bars 187 of the associated enclosure 186 laterally outwardly of the pivot bracket 193 of the frame 183. In this arrangement the springs 188 impart a downward pull on the lever arms 192, which in turn results in an upward pull on the side bars 187 and their associated enclosures 186. The purpose of this spring support arrangement is to weigh the tobacco accumulating in the enclosures 186 to provide an indication when a predetermined weight has been accumulated. This indication is obtained by closing of an electrical switch 194 upon engagement thereby of an operating arm 195 connected through intermediate link arms 196 to the inner ends of the lever arms 192. Thus, as the weight of tobacco causes the enclosure 186 to move downwardly against the bias of the springs 188 the lever arms 192 will pivot to raise their inner ends and the connected operating arm 195 until the operating arm 195 reaches the level of the switch 194 mounted on the frame 183 therebove and closes the switch to provide an electrical indication of tobacco accumulation. The intermediate link arms 196 are provided to accommodate the change in spacing between the ends of the lever arms 192 as the arms move arcuately while the operating arm 195 has a fixed extent. The closing of the switch 194 may energize an audible signal, such as a bell or horn, to advise the operator to stop feeding tobacco to the conveyor and to indicate that the turntable 166 should be rotated to position an empty enclosure in position for filling under the distributing section 168.

The tobacco receiving enclosures 186 are secured to the side bars 187 by horizontal supporting bars 197 and by a horizontal bottom framework 198. Connected to the supporting bars 197 of each enclosure is a back wall 199, opposed partial end walls 200 and a partial bottom wall 201. These walls cooperate with a tobacco container 167 mounted in relation thereto for defining a complete tobacco receiving enclosure 186. The tobacco containers are identical to the containers 30 and 31 of the precedingly described embodiment, having a bottom wall 202, opposed upstanding end walls 203 and an upstanding outer wall 204 connecting the side and bottom walls and forming an outer face on the container 167. The bottom wall 202 has a pair of pivot brackets 205 mounted on the underside thereof at the opposite sides and facing downwardly for mating with upwardly facing pivot brackets 206 on the bottom framework 198 for connection of pivot pins 207 therebetween. These pin connections support the tobacco containers 167 on the bottom framework 198 and allow pivoting of the containers 167 to a position to which the bottom walls 202 are vertical and are abutting the outer ends of the bottom framework 198 to position the containers 167 for removal of filled tobacco racks therefrom, as shown in lightlines in FIG. 16.

The tobacco containers 167 are adapted for receiving tobacco racks 32 in the same manner as described hereinabove with regard to the embodiment of FIGS. 1-11. This arrangement includes guide channels 208 secured to the side walls 203 of the containers in vertical disposition for receiving pin frames and being pivoted to horizontal dispositions upon pivoting of the containers 167 for sliding removal of filled tobacco racks therefrom. This rack receiving arrangement also includes the same type of flange 209 on the partial side walls 200, inclined guide rod 210 and flared guide pins 211 mounted on plates 212 extending from the partial bottom wall 201 as in the previously described embodiment.

Final insertion of a pin frame into the containers 167 to latch with base plates is performed after initial manual partial insertion by a leverage applying mechanism 213 of conventional construction mounted on the top of the center post 178. This mechanism 213 has a fixed horizontal member 214 to the ends of which two lever arms 215 extend and are biased to a vertical disposition by torsion springs 216 acting between horizontal shafts 217 to which the lever arms 215 are attached and the fixed horizontal member 214. The outer ends of the lever arms 215 are connected by a cross rod 218 that serves as a handle for manual manipulation of the mechanism. A horizontal shaft 219 is pivotally mounted to the lever arms 215 intermediate their ends and carries three pin frame engaging elements 220 that hang from the shaft 219 in vertical disposition during pivoting of the lever arms 215. These pin frame engaging elements 220 are located above the ends of the pin frame and above the center of the pin frame and have bottom edges 221 shaped to engage the pin frame positioned in the guide channel 208 so that upon manual lowering of the lever arms 215 the leverage will be applied through the pin frame engaging elements 220 to the pin frame to complete full insertion of the pin frames through the tobacco in the containers 167 until the pin frames latch in the base plates to complete closure of the racks. The leverage applying mechanism 213 is then raised and the tobacco container 167 pivoted outwardly to dispose the rack in horizontal disposition for sliding removal from the container in position for insertion in a bulk curing barn.

In both of the preferred embodiments illustrated and described in detail herein, the tobacco containers 30, 31 and 167 are of a shape and size to accommodate a conventional tobacco rack, but it should be understood that the present invention is applicable to containers and racks of various shapes and sizes wherein the apparatus utilizes the concepts of the present invention. Similarly, the present invention is not intended to be limited to a particular conveyor system or trailer construction and the invention could be adapted as well for use directly on a combine wherein the tobacco would be conveyed from the defoliating mechanisms to tobacco containers carried on the combine as the combine is harvesting tobacco in a field.

Other and further modifications and variations of the present invention beyond the specific embodiments disclosed are contemplated within the scope of the present invention, which is intended to be limited only by the scope of the appended claims.

I claim:

1. Tobacco leaf handling apparatus for facilitating the loading of tobacco leaves into successive bulk curing structures each of which includes a plurality of parts movable with respect to one another between a tobacco leaf receiving and loading position and a tobacco leaf supporting and curing position, said apparatus being operable to transfer harvested tobacco leaves from a source into contained relation with successive parts of successive tobacco curing structures positioned with an area having a substantial horizontal extent, said apparatus comprising conveyor means adapted to receive harvested tobacco leaves from a source and arranged for discharging the leaves from an end thereof with a force sufficient to propel the leaves through the air along and to the end of a flow path above said area having a greater horizontal extent than the horizontal extent of said area, means for supporting successive curing structure parts within said area in a position below said flow path so that discharged tobacco leaves flowing in said path are available to be moved downwardly out of said path into contained relation with respect thereto, tobacco leaf deflecting means mounted above said part supporting means within said flow path for generally horizontal cyclical movements in the direction of extent of said flow path, means for effecting continuous cyclical movements of said deflecting means, said tobacco leaf deflecting means including leaf engaging surface means open in a horizontal direction toward the discharge end of said conveyor means operable during the cyclical movement of said leaf deflecting means to intercept by engagement therewith successively available leaves propelled through the air along the flow path at different horizontal positions determined by the position of cyclic movement of said leaf deflecting means when engagement occurs so as to effect a substantially uniform distribution of the leaves in the direction of extent of the flow path with respect to said part supporting means therebelow.

2. Tobacco handling apparatus as defined in claim 1 and further characterized by means for confining said flow path to a predetermined width corresponding to the desired width of tobacco distribution in said contained relation.

3. Tobacco handling apparatus as defined in claim 1 and further characterized in that said deflecting means comprises a baffle plate reciprocating horizontally in said flow path above said part supporting means.

4. Tobacco handling apparatus as defined in claim 1 and further characterized in that said deflecting means comprises a baffle plate disposed in said flow path of said tobacco leaves and oscillatable about an axis disposed above and extending transverse to said flow path.

5. Tobacco handling apparatus as defined in claim 1 and further characterized in that a pair of tobacco distributing rolls are disposed adjacent said end of said conveyor means, said rolls having a nip through which said discharging tobacco leaves pass in said flow path.

6. Tobacco handling apparatus as defined in claim 5 and further characterized in that said deflecting means comprises a baffle plate reciprocating horizontally in said flow path above said part supporting means.

7. Tobacco handling apparatus as defined in claim 5 and further characterized in that said deflecting means comprises a baffle plate disposed in said flow path of said tobacco leaves and oscillatable about an axis disposed above and extending transverse to said flow path.

8. Tobacco handling apparatus as defined in claim 1 and further characterized in that said part supporting means comprises at least two tobacco containers disposed in a row aligned with and underneath said flow path and having a combined horizontal extent in the direction of said flow path corresponding to the horizontal extent of said flow path.

9. Tobacco handling apparatus as defined in claim 8 and further characterized in that there are two said tobacco containers disposed end-to-end, and said deflecting means is operable to distribute leaves to said containers selectively for alternate filling thereof.

10. Tobacco handling apparatus as defined in claim 8 and further characterized in that said deflecting means includes a flow path varying component associated with each of said tobacco containers and operable to distribute leaves uniformly to its associated container.

11. Tobacco handling apparatus as defined in claim 10 and further characterized in that at least the one of said components closest to said conveyor means discharge end is selectively movable to an inoperable position out of said flow path.

12. Tobacco handling apparatus as defined in claim 11 and further characterized by means for moving said movable component to an inoperable position in response to a predetermined weight of tobacco leaves accumulating in the container associated with said movable component.

13. Tobacco handling apparatus as defined in claim 12 and further characterized in that there are two containers and said component moving means moves said movable component from its inoperable position to an operable position in response to a predetermined weight of tobacco accumulating in the container associated with the other component.

14. Tobacco handling apparatus as defined in claim 11 and further characterized in that each of said flow path varying components comprises a baffle plate reciprocating horizontally in said flow path above its associated container.

15. Tobacco handling apparatus as defined in claim 1 and further characterized by said part supporting means includes container means for retaining said tobacco leaves in said contained relation, said container means being adapted to receive successive pin frame parts insertable in the tobacco leaves retained in said container means, pin frame inserting means operable to seat pin frames in said container means and mounted on said supporting means for movement between an operable pin frame engaging and inserting position above said container means and an inoperable position out of the path of flow of tobacco leaves to said container means.

16. Tobacco handling apparatus as defined in claim 1 and further characterized in that said source comprises a trailer, having a flat bottom surface for supporting a supply of harvested tobacco leaves, and in that means are provided for supporting said trailer adjacent said conveyor means, and means for disposing said flat bottom surface of said trailer at an inclination extending downwardly toward said conveyor means whereby said tobacco leaves in said trailer can be readily transferred to said conveyor means.

17. Tobacco handling apparatus as defined in claim 1 and further characterized by means operable to provide an electrical signal in response to a predetermined weight of tobacco leaves accumulating in said tobacco containing means.

18. Tobacco handling apparatus as defined in claim 1 and further characterized in that said part supporting means includes at least two tobacco containers, and means for moving said containers to selectively position the containers alternately beneath said tobacco leaf flow path.

19. Tobacco handling apparatus as defined in claim 18 and further characterized in that said means for selectively moving said containers comprises a selectively rotatable turntable having said containers disposed in diametrically opposed relation thereon.

20. Tobacco handling apparatus as defined in claim 1 and further characterized in that said part supporting means includes at least two tobacco containers each having an open top, a flat bottom wall, and a pair of opposed end walls extending upwardly from the ends of said bottom wall in perpendicular relation thereto and having means for receiving a vertically disposed pin frame part therebetween, each said container being selectively pivotable on said apparatus from a loading position at which said bottom wall is disposed at a normal horizontal position to an unloading position at which said bottom wall is disposed upright and said pin frame part is disposed horizontally to permit removal of the pin frame part from said container in a horizontal direction.

21. Tobacco handling apparatus as defined in claim 20 and further characterized in that said opposed end walls have vertically extending guide channels for vertical sliding receipt of said pin frame part therein and being disposed horizontally upon pivoting of said container to support said pin frame part therein and permit horizontal sliding removal thereof.

22. Tobacco handling apparatus as defined in claim 20 and further characterized in that said containers are pivotally mounted on said apparatus for pivoting about a horizontal axis extending in the direction of the flow path of discharging tobacco leaves to permit pivoting of said containers from a receiving position in which the individual tobacco leaves are horizontally disposed to a removal position in which the tobacco leaves are vertically disposed in position for subsequent curing.

23. Tobacco handling apparatus as defined in claim 1 and further characterized in that said part supporting means includes a tobacco container selectively pivotable on said apparatus from a horizontal loading position for receiving tobacco to a vertical unloading position.

24. Tobacco handling apparatus as defined in claim 23 and further characterized in that said pivotable tobacco container is pivoted about a horizontal axis extending in the direction of the flow path of discharging tobacco leaves to permit pivoting of said container from a receiving position in which individual tobacco leaves are horizontally disposed to a removal position in which the tobacco leaves are vertically disposed in a position for subsequent curing.

* * * * *